(12) United States Patent
Broers et al.

(10) Patent No.: US 11,143,749 B2
(45) Date of Patent: Oct. 12, 2021

(54) OBJECT DETECTION SYSTEM AND METHOD

(71) Applicant: PHILIPS LIGHTING HOLDING B.V., Eindhoven (NL)

(72) Inventors: Harry Broers, 'S-Hertogenbosch (NL); Ruben Rajagopalan, Neuss (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 705 days.

(21) Appl. No.: 15/313,634

(22) PCT Filed: May 5, 2015

(86) PCT No.: PCT/EP2015/059866
§ 371 (c)(1),
(2) Date: Nov. 23, 2016

(87) PCT Pub. No.: WO2015/176953
PCT Pub. Date: Nov. 26, 2015

(65) Prior Publication Data
US 2017/0212226 A1 Jul. 27, 2017

(30) Foreign Application Priority Data
May 23, 2014 (EP) .................................... 14169693

(51) Int. Cl.
| | |
|---|---|
| *G01S 3/08* | (2006.01) |
| *G01S 7/4911* | (2020.01) |
| *G01S 7/4912* | (2020.01) |
| *G01S 17/04* | (2020.01) |
| *F21S 8/08* | (2006.01) |
| *G01S 17/32* | (2020.01) |

(52) U.S. Cl.
CPC .......... *G01S 7/4911* (2013.01); *G01S 7/4918* (2013.01); *G01S 17/04* (2020.01); *F21S 8/086* (2013.01); *G01S 17/32* (2013.01)

(58) Field of Classification Search
CPC .................................. G01S 17/00; G01C 3/00
USPC ................................................ 356/3.01–5.15
See application file for complete search history.

(56) References Cited

U.S. PATENT DOCUMENTS 3,898,007 A * 8/1975 Wiklund .................. G01C 3/04
356/4.01
4,627,734 A * 12/1986 Rioux .................... G01B 11/24
356/3.04
(Continued)

FOREIGN PATENT DOCUMENTS

CN 1502047 A 6/2004
CN 102665333 A 9/2012
(Continued)

*Primary Examiner* — Samantha K Nickerson

(57) ABSTRACT

An object detection system is for object detection within a field of view. A light source provides detection illumination to the field of view and a sensor senses reflected light from the field of view. Time of flight analysis is used to provide distance or presence information for objects within the field of view. The controller is adapted to derive a signal quality parameter relating to the distance or presence information and to control the light source intensity in dependence on the signal quality parameter. In this way, energy savings are made possible by adapting the detection system settings to the scene being observed.

13 Claims, 3 Drawing Sheets

(56) References Cited

U.S. PATENT DOCUMENTS

| | | | |
|---|---|---|---|
| 5,652,651 A * | 7/1997 | Dunne | G01C 3/08 342/91 |
| 6,717,655 B2 * | 4/2004 | Cheng | G01S 17/95 356/4.01 |
| 6,873,406 B1 * | 3/2005 | Hines | G01S 7/4808 356/141.1 |
| 9,121,703 B1 * | 9/2015 | Droz | G01C 3/08 |
| 9,148,649 B2 * | 9/2015 | Raskar | G01S 7/487 |
| 10,031,229 B1 * | 7/2018 | Koenck | G01S 17/10 |
| 2008/0030711 A1 * | 2/2008 | Iizuka | G01S 11/12 356/4.03 |
| 2009/0072170 A1 | 3/2009 | Kurihara et al. | |
| 2009/0147239 A1 * | 6/2009 | Zhu | G01S 7/4812 356/3.12 |
| 2009/0284747 A1 * | 11/2009 | Valois | H05B 47/18 356/448 |
| 2010/0121577 A1 * | 5/2010 | Zhang | G01S 17/931 701/301 |
| 2011/0304842 A1 | 12/2011 | Kao et al. | |
| 2012/0008128 A1 | 1/2012 | Bamji | |
| 2012/0249013 A1 * | 10/2012 | Valois | H05B 47/105 315/291 |
| 2012/0261516 A1 * | 10/2012 | Gilliland | B64D 39/00 244/183 |
| 2013/0039053 A1 | 2/2013 | Takakura et al. | |
| 2013/0044310 A1 | 2/2013 | Mimeault | |
| 2013/0235364 A1 | 9/2013 | Kyung et al. | |
| 2013/0235366 A1 | 9/2013 | Giacotto et al. | |
| 2013/0271752 A1 * | 10/2013 | Bellian | G01N 21/27 356/73 |
| 2014/0247439 A1 * | 9/2014 | Neier | G01C 15/002 356/4.01 |
| 2014/0350836 A1 * | 11/2014 | Stettner | G01S 17/023 701/301 |
| 2015/0253428 A1 * | 9/2015 | Holz | G01S 17/36 356/5.01 |
| 2015/0331107 A1 * | 11/2015 | Galera | G01S 17/026 382/165 |
| 2015/0346325 A1 | 12/2015 | Giacotto et al. | |
| 2017/0212226 A1 * | 7/2017 | Broers | G01S 7/4918 |

FOREIGN PATENT DOCUMENTS

| | | |
|---|---|---|
| JP | 1996086875 A | 4/1996 |
| JP | H08086875 A | 4/1996 |
| JP | 2005077379 A | 3/2005 |
| JP | 2009520194 A | 5/2009 |
| JP | 2009192499 A | 8/2009 |
| JP | 2010025906 A | 2/2010 |
| WO | 2013026608 A1 | 2/2013 |
| WO | 2013158955 A1 | 10/2013 |
| WO | 2013179280 A1 | 12/2013 |
| WO | 2015032721 A1 | 3/2015 |

* cited by examiner

OBJECT DETECTION SYSTEM AND METHOD

CROSS-REFERENCE TO PRIOR APPLICATIONS

This application is the U.S. National Phase application under 35 U.S.C. § 371 of International Application No. PCT/EP2015/059866, filed on May 5, 2015, which claims the benefit of European Patent Application No. 14169693.0, filed on May 23, 2014. These applications are hereby incorporated by reference herein.

FIELD OF THE INVENTION

The invention relates to object detection systems, for example for use in controlling a lighting system to provide energy savings by monitoring activity.

BACKGROUND OF THE INVENTION

Object detection can be used by a lighting system to provide automated control of the lighting, for example to provide energy savings when the lighting is not needed.

Object detection can be based on mapping the range to objects within a field of view using time of flight sensor principles. Time of flight measurement is based on active illumination that is projected onto the observed scene. The reflected light from the active illumination source is captured by a sensor which measures the phase between the transmitted and received illumination, from which the time of flight and therefore range can be derived. By analyzing the range information for the full field of view, objects can be identified using image analysis techniques.

The accuracy of the phase measurement and thus range data depends on the illumination intensity and reflectivity of the objects in the scene.

Known time of flight solutions for example may aim to achieve centimeter accuracy for the complete observed area by using an intense and uniform illumination. However, some applications such as outdoor lighting control in fact require significantly lower accuracy depending on the sensing task and object properties. A sensing solution optimized for its detection task will therefore always result in lower energy consumption than an over-specified solution.

There is therefore a need to tailor the sensing function to the required degree of accuracy. This is of particular importance with time of flight sensing because it requires continuous active illumination that requires more energy than passive sensing methods.

SUMMARY OF THE INVENTION

The invention is defined by the claims.

According to the invention, there is provided an object detection system for object detection within a field of view, comprising:

a light source for providing detection illumination to the field of view;

a sensor for sensing reflected light from the field of view; and a controller for processing the sensed reflected light and for performing time of flight analysis to provide distance or presence information in relation to objects within the field of view, wherein the controller is adapted to derive a signal quality parameter relating to the distance or presence information and to control the light source intensity in dependence on the signal quality parameter.

The invention is based on the recognition that the illumination intensity for a time of flight system can be adapted according to a measured signal quality, for example in combination with a required signal quality. For example, parts of the background of the scene with high reflectivity give higher signal quality and therefore may require lower illumination intensity.

In this way, an optimized illumination intensity for time of flight sensing can be obtained. The intensity may for example depend on the signal to noise levels in the observed scene. The illumination intensity may then be optimized based on the properties of the objects to be detected and the scene. Detection of objects with high reflectivity requires lower illumination intensity. Also, larger-size objects require less illumination intensity because the objects will occupy more elements of a sensing matrix. The information from multiple sensing elements can in that case be used to increase the signal to noise ratio.

For example, in a presence-based lighting application, detection of vehicles requires lower time of flight illumination intensity than smaller and less reflective pedestrians. The optimal time of flight illumination intensity can be determined by analysis of signal quality levels in the scene and/or defined by the prescribed detection task.

The controller may be adapted to compare the signal quality parameter with a target value and to control the light source intensity in response to the comparison. In this way, a target value for the signal quality is set, and this corresponds to the required signal quality for the particular scene and the objects to be detected. In this way, the illumination intensity can be kept to a minimum while ensuring the desired object detection can be carried out.

The system may comprise at least first and second light sources for providing detection illumination to different regions of the field of view, wherein the controller is adapted to compare the signal quality parameter with a respective target for each region and to control the light source intensity for each light source in response to the comparison.

This enables different portions of a field of view to be handled separately. For example, the different regions of the field of view may comprise a first region designated for vehicles and a second region designated for pedestrians, or a first region of relatively high background reflectivity and a second region of relatively low background reflectivity. Vehicle detection may require a lower signal quality than for people, and similarly, a highly reflective background may give an improved signal quality for a given illumination intensity.

The invention also provides a lighting system, comprising:

an object detection system of the invention; and a lighting system for lighting the field of view.

The lighting system can then be controlled in dependence on the detection of objects by the object detection system. This enables the lighting to react to the presence of people (pedestrians or vehicle drivers) so that lighting is only provided when needed. This enables power savings to be obtained. The lighting system may comprise a street light.

The invention also provides an object detection method for object detection within a field of view, comprising:

providing detection illumination to the field of view;

sensing reflected light from the field of view;

processing the sensed reflected light and performing time of flight analysis to provide distance or presence information in respect of objects within the field of view;

deriving a signal quality parameter relating to the distance or presence information; and controlling the intensity of the detection illumination in dependence on the signal quality parameter.

The invention also provides a computer program comprising code means which is adapted, when run on a computer, to implement the method of the invention.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an object detection system for object detection within a field of view. A light source provides detection illumination to the field of view and a sensor senses reflected light from the field of view. Time of flight analysis is used to provide distance or presence information for objects within the field of view. The controller is adapted to derive a signal quality parameter relating to the distance or presence information and to control the light source intensity in dependence on the signal quality parameter. In this way, energy savings are made possible by adapting the detection system settings to the scene being observed.

By controlling the light source intensity, the transmitted optical power is adapted based on the detection task, so that lower power consumption is achieved and less thermal energy is generated. Lower power consumption may for example enable devices powered by solar energy or batteries to operate for longer periods. Reduced thermal energy dissipation enables the design of more compact modules, and reduced thermal interference with the sensing modality itself resulting in lower noise levels.

Figure 1:
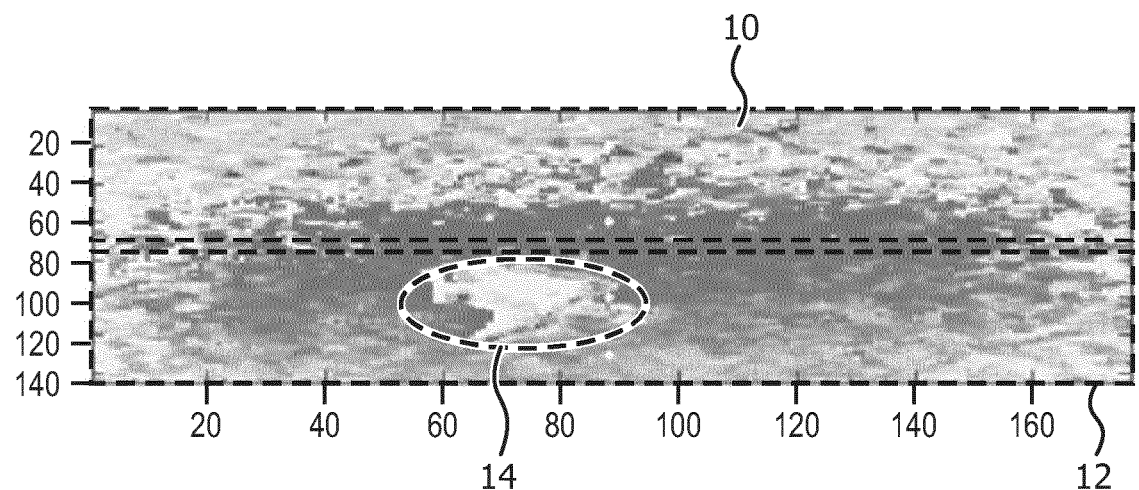
FIG. 1 shows a first example of the information obtained by a time of flight analysis of a scene.

FIG. 1 shows an image representing a range measurement using a time of flight imager at a height of 6 m directed towards the ground. The image is a top view of the illuminated scene. For example this represents a downward view from the top of a lamp post or light pole.

The range distance is represented with a grey scale map, where a lighter shade represents a closer object and a darker shade represents a further object.

The region 10 represents a grass area, while the region 12 represents a road surface. The variation in range data is larger for the grass area 10 due to the reduced reflective properties. Thus, it can be seen that the signal to noise ratio is lower for the area 10.

The image contains a pedestrian 14 at coordinates (x,y: 75,100). Due to the high reflectivity of both the pedestrian and the road surface, it is trivial to distinguish the pedestrian due to the high signal to noise ratio. In this case, lowering the time of flight illumination intensity will still result in proper detection performance.

If instead, the pedestrian is walking on the grass surface 10, the signal to noise ratio will be lower and for proper detection performance more illumination is required to create a similar contrast.

Figure 2:
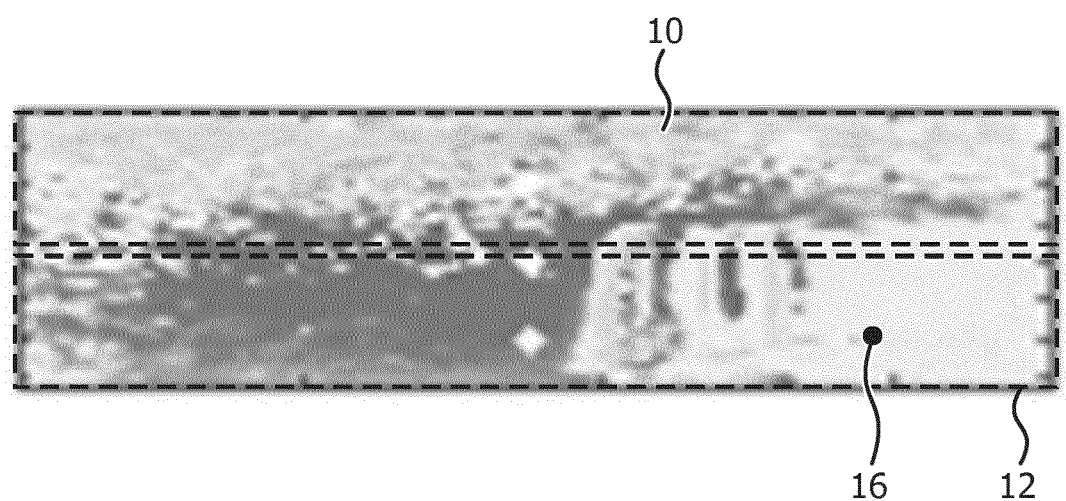
FIG. 2 shows a second example of the information obtained by a time of flight analysis of a scene.

FIG. 2 shows a range measurement with the same setup when a vehicle 16 is present. Due to its size, the vehicle occupies a larger area of the field of view and therefore illuminates more elements of the sensing matrix. Accumulation of the information from all these elements can be used to improve the signal to noise ratio significantly and thus enabling even lower illumination intensity.

Figure 3:
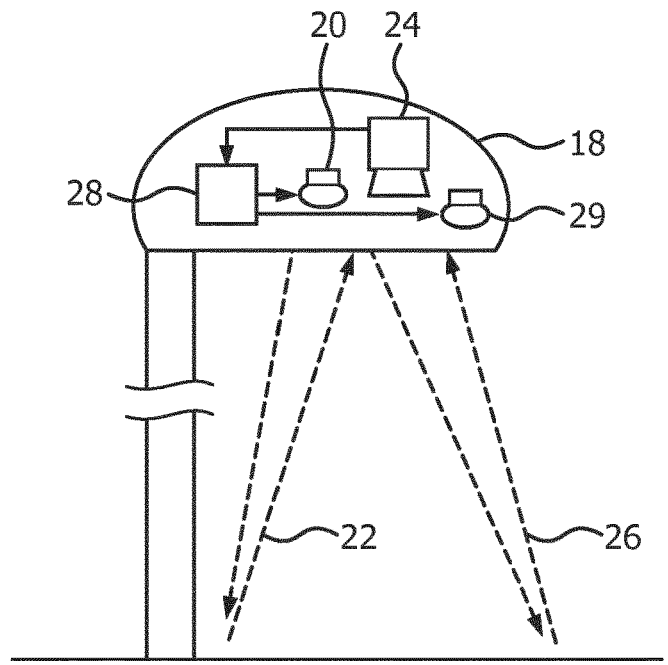
FIG. 3 shows an example of system of the invention used within a road lighting luminaire.

FIG. 3 shows an example of an object detection system according to the invention, integrated into a road lighting luminaire 18. It comprises a light source 20 for providing detection illumination 22 to the field of view and a sensor 24 for sensing reflected light 26 from the field of view. The sensor for example comprises a charged coupled device (CCD) optical sensor or photodiode array.

The invention is based on the recognition that different types of object and lighting conditions require different optical power for the illumination of the scene for processing by the sensor.

The larger the object, the more noise filtering can be applied so that less optical power is required for acceptable detection.

The contrast between the object and background can be caused by high reflectance of the object with respect to the background or by high reflectance of the background with respect to the object. In the first case, the optical power level can be chosen such that only the objects in the scene provide sufficient reflectivity to enable range or presence information to be determined. In the latter case, the minimum amount of optical power is provided to detect the background, so that the foreground objects will cause readings based on the lack of range or presence information.

The different absorption and reflection properties of the objects and background will be wavelength dependent. Besides wavelength dependent absorption, also the surface characteristics play a role. For example, porous surfaces will attenuate the incident light more than impermeable surfaces with high reflectivity.

The wavelength used for the object detection may for example be the typical near infra red (NIR) band (e.g. 830 nm to 940 nm) commonly used in time of flight systems. The wavelength could also comprise a visible small part or complete spectrum of a typical light source (e.g. LED) depending on the spectral properties of the object/background to be detected.

A controller 28 processes the sensed reflected light 26 and performs time of flight analysis to provide distance information to objects within the field of view, or else to perform more simply presence detection.

The luminaire has a separate light source 29 for illuminating the scene with visible light.

Time of flight analysis is well known, and time of flight cameras are for example widely available. A time of flight camera resolves distance based on the known speed of light, by measuring the time of flight of an emitted light signal between the camera and the subject for each point of the image. The entire scene can be captured with each laser or light pulse, so that a scanning system is not required. Known systems cover ranges of a few centimeters up to several kilometers. The distance resolution is about 1 cm. By way of example, the sensor may comprise an array of 320×240 pixels. The number of pixels can be selected according to the system needs, and of course the more pixels are provided the more image processing is required. The system can operate very quickly, for example providing up to 160 images per second.

The simplest version of a time of flight system uses light pulses. The illumination is switched on for a very short time, and the resulting light pulse illuminates the scene and is reflected by the objects. The sensor gathers the reflected light and images it onto the sensor plane.

Depending on the distance, the incoming light experiences a delay. As light has a speed of approximately c=300,000,000 meters per second, this delay is very short: an object 2.5 m away will delay the light by 16.66 ns.

The pulse width of the illumination determines the maximum range the camera can handle. With a pulse width of e.g. 50 ns, the range is limited to 7.5 m To generate the short light pulses required, LEDs or lasers can be used.

The sensor plane comprises an array of pixels, each of which comprises a photo sensitive element such as a photodiode. The time of flight measurement may for example make use of a time counter, running at several gigahertz, connected to each photodetector pixel, which stops counting when light is sensed.

To eliminate the influence of a background signal, the measurement can be performed a second time with the illumination switched off. Also it is possible to eliminate the effect of objects further away than the distance range by performing a second measurement with the control signals delayed by an additional pulse width.

The time of flight system essentially creates a distance map such as shown in FIGS. 1 and 2. To recognize objects with the field of view, image processing techniques are carried out based on known characteristics of the objects to be detected, such as their size, reflectance, expected speed of movement etc. Standard image processing techniques can be used for object detection based on the distance map. As an alternative (discussed below), instead of a pixelated distance map, simple detection of an object can be provided, i.e. based on the detection of a difference between the scene and the known static background. In this case, no image processing is required to try to identify the nature of objects. Thus, in this example the time of flight sensor generates presence information rather than distance information.

In accordance with the invention the controller 28 is adapted to derive a signal quality parameter relating to the distance information (i.e. the time of flight data) and to control the light source intensity in dependence on the signal quality parameter. For example, this signal quality parameter can comprise a signal to noise ratio.

For this purpose, the controller implements an algorithm that estimates the signal to noise ratio of the time of flight sensor signals when observing a scene and its objects.

In order to obtain the signal to noise ratio, a background model can be constructed by a machine learning process or statistical analysis, by which observations over a period are analysed to cancel out disturbances caused by moving objects. For each pixel location in the image, the noise floor can be obtained (for example by Gaussian mixture modeling). Instead of the granularity at the level of individual pixels, larger regions can be used to obtain the statistics (e.g. 8×8 blocks).

Based on the constructed background model, the objects of interest can be identified due to change in pixel values with respect to the background. The object will comprise a group of pixels from which typical shape properties of the object can be derived. The corresponding pixel values are used to build a generic object model based on multiple observations (machine learning or statistical analysis). Based on the detected contrast, the optical power can then be adapted to enable optimal energy-efficiency with sufficient detection performance. The true signal is then a deviation in the signal above the threshold based on the modeled noise floor and trained object model.

The signal to noise ratio is only one example of suitable measurement. Rather than measuring the signal to noise ratio, other parameters can be measured which themselves have an influence on the signal to noise ratio. These parameters can thus be considered to be signal quality parameters, and they can also be used as indicators of signal quality, so that the required optical power can be adjusted.

For example, the temporal properties of detected objects can be taken into account. Slow moving objects will be observed more and thus temporal filtering can improve the signal to noise ratio and thus lower optical power. The velocity of objects can be derived with object tracking algorithms common in computer vision.

The spatial properties of objects also have an influence. Large objects comprise more pixels and thus spatial filtering can improve the signal to noise ratio and thus lower optical power. The shape of objects can be derived with morphological/shape analysis algorithms common in computer vision.

Besides range information (3D information) the time of flight analysis can also provide appearance information (in 2D like normal cameras). Objects with high brightness require less emitted optical power to provide range information, so that the reflectance properties can be taken into account. The brightness of objects can be derived with basic computer vision algorithms.

The 3D geometry of objects can also be derived. Objects with a distinctive 3D geometry/signature (e.g. slopes, discontinuities, etc.) will stand out with respect to planar surfaces of the background. A more unique/distinctive 3D profile results in higher contrast in 3D with the background and thus a reduced optical power will be required.

Ambient illumination (artificial or sunlight) will affect the signal to noise ratio. Less ambient light will improve the signal to noise ratio and thus reduced optical power will be required. This can be measured directly by image analysis of intensity information.

For a particular detection task, a corresponding target signal to noise ratio (or target values for other quality parameters) can be pre-set which corresponds to a correct ability to provide the detection function.

Such target values could for example be modeled based on information from calibration measurements during product development. During sensor configuration, the user could indicate regions within the sensor field of view and describe their traffic type (cars, pedestrians, etc.) or ground coverage type (road, grass, etc.). Thus, a user or factory calibration function can be used to assist in the learning process. During sensor initialization, the sensor can adapt the preprogrammed sensor behavior based on measured signal to noise ratios between the object and background model. During normal operation the sensor can monitor the signal to noise levels and in case of large deviations update the object and background model. Thus, a learning process may be used to maintain accurate sensing.

Based on a target signal to noise ratio level, the minimal required illumination intensity for the time of flight system can be derived. The illumination system is then controlled adapted to the required illumination intensity. This may comprise a single light source or multiple light sources for different portions of the field of view.

Figure 4:
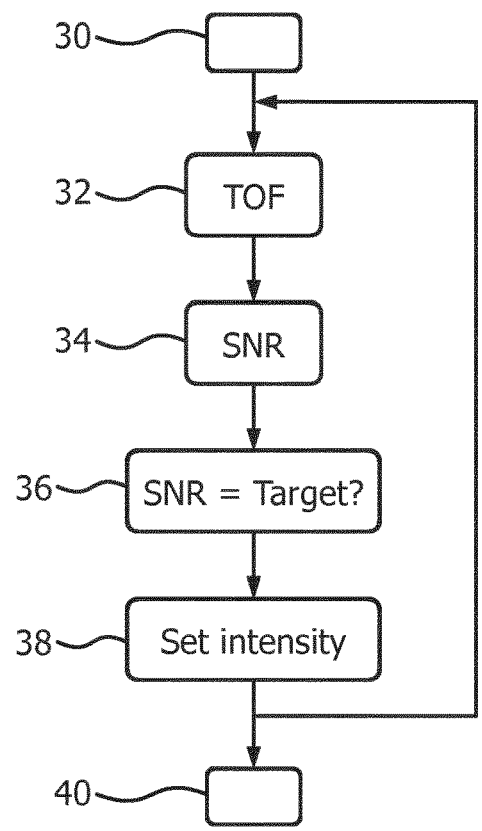
FIG. 4 shows a method of the invention.

FIG. 4 shows the method. The method starts in step 30. In step 32 the time of flight analysis is carried out, in conventional manner. The illumination setting of the detection light source will have been set by previous iterations of the method, or it may comprise an initial starting value. For example, at start up, the maximum intensity may be used, and the system then lowers the intensity until a limit is reached.

In step 34 the signal quality parameter is obtained, such as the signal to noise ratio (SNR).

In step 36 the signal quality parameter is compared with the target.

In step 38 the detection lighting intensity is set, based on the comparison of the signal quality with the target value.

The process repeats continuously until the system is turned off and the process then ends in step 40.

The intensity setting may be carried out less frequently than the time of flight analysis.

Typically the time of flight sensor runs on sampling rates of 30 Hz. However, it is not required that the intensity is adapted with the same frequency. The signal to noise ratio depends on relative slowly changing conditions like weather conditions and ambient light levels (sunset, daytime, sundown, nighttime). Thus, the update rate of the intensity will be low frequent (for example much greater than 1 minute). The status of the luminaire could also affect the signal to noise ratio and the intensity could be adapted with the same frequency as the switching of the luminaire output (e.g. 30 seconds to 15 minutes).

One application of the system is to adapt the illumination for specific object types.

Figure 5:
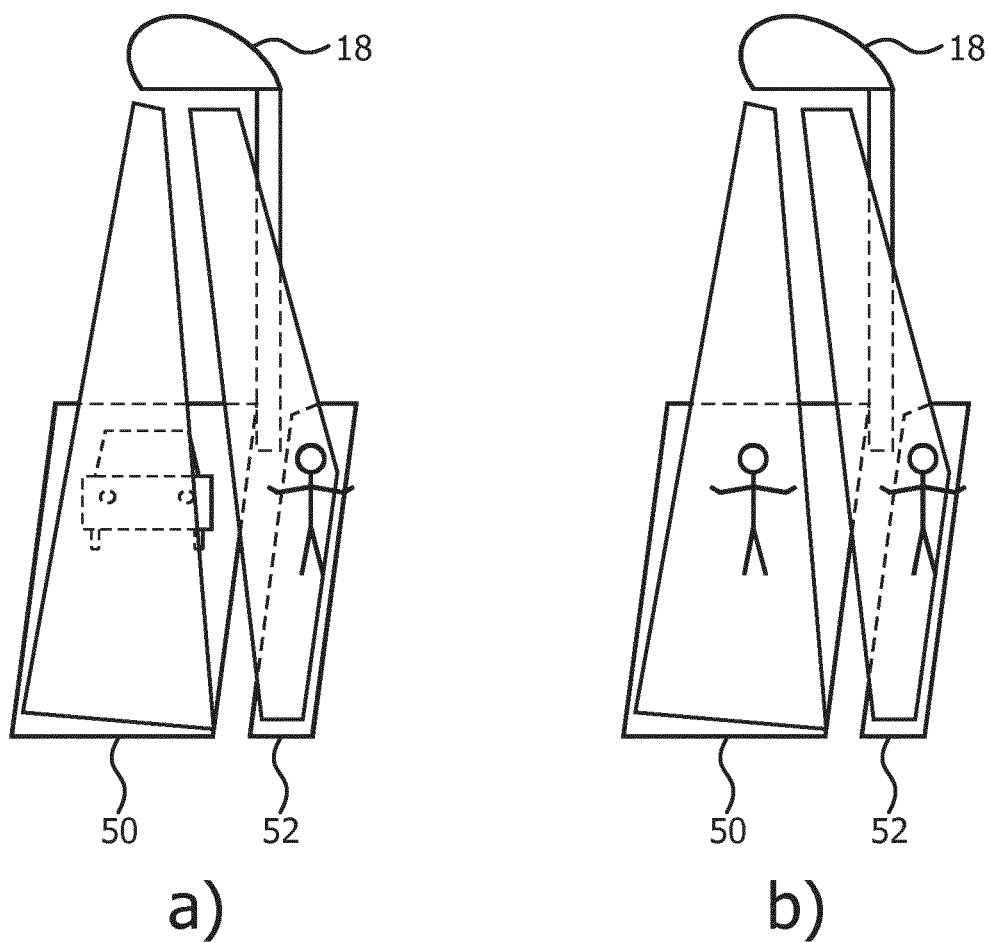
FIG. 5 is used to show how different regions of a field of view can have different illumination intensities applied for time of flight analysis.

FIG. 5(a) shows an example in which the illumination intensity varies for the traffic type.

In this example, the system comprises two light sources for providing detection illumination to different regions of the field of view. Each region has its own target signal quality parameter and the light source intensity of each light source is controlled based on the signal quality comparison.

The field of view comprises a first region 50 designated for vehicles and a second region 52 designated for pedestrians. In addition to differences in the type of object, the different regions may also have different background characteristics. For example, the first region 50 may be of relatively high background reflectivity (such as a road) whereas the second region of relatively low background reflectivity (such as a grass verge).

A less intense detection lighting beam can be used for the region 50 with only vehicles, while a more intense detection illumination beam can be used for the pedestrian area 52. This system can be realized with two separate time of flight sensors observing separate beams, or else a single (multiple element) time of flight sensor can observe both beams.

In respect of the background properties, the area 52 with a less reflective surface can be illuminated by a beam with normal intensity, while the region 50 with high reflectivity can make use of lower illumination intensity.

FIG. 5(b) shows an example in which the illumination intensity varies for the type of background surface, even for the same traffic type. In this case, people are to be detected in both different regions.

The target signal quality parameter will thus take into account both the nature of the scene in the field of view or in different parts of the field of view, as well as the size and reflection characteristics of the objects that are to be detected with the field of view or the respective part of the field of view. The objects to be detected may be the same in regions which are different (FIG. 5(b)), or the scenes may be the same (such as a tarmac pavement and a tarmac road) but the objects can be different, or else there can be differences in both (FIG. 5(a)).

The detection lighting intensity can also be adapted to take account of the object distance. The reflected signal depends on the object reflectivity and the object distance so that close objects will have strong reflections. The range information can thus also be used to adapt the illumination intensity. This approach can also be used to prevent intense illumination of close-by objects with low reflectivity.

In order to create the distance map images of FIGS. 1 and 2, time of flight sensors using an array of sensor elements can be used. However, in a simplest embodiment, single element time of flight sensors can be used (for example one for each separate field of view). A single detector element can be used simply to provide a distinction between presence and absence, with no spatial information. The time of flight sensor will provide the shortest range to the objects in the field of view.

Based on the detected range and the signal strength, it may be possible even from a single element sensor to discriminate between the presence of a vehicle or a pedestrian. Thus, two separate dedicated detection zones may then not be required.

The required detection lighting intensity can be estimated by monitoring the signal to noise levels in case of a single element time of flight sensor or the distribution of signal to noise levels in the case of multiple elements time of flight sensors.

The required illumination intensity may take into account user input, for example to give information about the nature of the field of view and the required detection task. This may for example replace or simplify a calibration or initialization stage.

As will be clear from the examples above, the invention is of interest for lighting control and activity monitoring using active illumination. A reduction in energy consumption and improved performance are made possible.

The invention is however also applicable to sensor-driven applications like gesture control. In this case, the purpose is not to detect the presence of a particular type of object, but to detect a particular gesture. Again, there will be threshold signal quality level at which the gesture can no longer be detected, and the system enables power savings by reducing the illumination intensity until this threshold is approached.

As discussed above, the invention makes use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An object detection system for object detection within a field of view, comprising:
   a light source for providing detection illumination to the field of view;
   a sensor for sensing reflected light from the field of view; and
   a controller for processing the sensed reflected light and for performing time of flight analysis to provide distance or presence information in relation to objects within the field of view,
   wherein the controller is adapted to derive a signal quality parameter relating to the distance or presence information and to control said light source to output light with a given intensity in dependence on the signal quality parameter, the signal quality parameter comprising a signal to noise ratio,
   wherein the given intensity of the light output by said light source is tailored to both an extent of reflection, by a given object, of said light output by said light source and an extent of reflection, by a background region adjacent to said given object, of said light output by said light source.

2. A system as claimed in claim 1, wherein the controller is adapted to compare the signal quality parameter with a target value and to control, in response to the comparison, said light output by said light source.

3. A system as claimed in claim 1, wherein the controller is adapted to compare the signal quality parameter with a respective target for each of said given object and a second region and to control, in response to the comparison, the light output by said light source and light output by a second light source.

4. A system as claimed in claim 1, wherein the background region comprises a road or a grass verge.

5. A lighting system, comprising:
   an object detection system as claimed in claim 1; and
   a lighting system for lighting the field of view.

6. A lighting system as claimed in claim 5, wherein the lighting system is controlled in dependence on the object detection by the object detection system.

7. A lighting system as claimed in claim 5, wherein said light source is a street light.

8. An object detection method for object detection within a field of view, comprising:
   providing detection illumination to the field of view;
   sensing reflected light from the field of view;
   processing the sensed reflected light and performing time of flight analysis to provide distance or presence information in respect of objects within the field of view;
   deriving a signal quality parameter relating to the distance or presence information comprising a signal to noise ratio; and
   controlling an intensity of the detection illumination in dependence on the signal quality parameter,
   wherein a light source provides the detection illumination to the field of view, and
   wherein the controlling is configured such that a given intensity of light output by said light source is tailored to both an extent of reflection, by a given object, of said light output by said light source and an extent of reflection, by a background region adjacent to said given object, of said light output by said light source.

9. A method as claimed in claim 8, comprising comparing the signal quality parameter with a target value and controlling the intensity of the detection illumination in response to the comparison.

10. A method as claimed in claim 8, comprising:
    comparing the signal quality parameter with a respective target for each of said given object and a second region and to control, in response to the comparison, the light output by the light source and light output by a second light source.

11. A method of providing lighting, comprising:
    performing the object detection of the method of claim 8; and
    controlling lighting of the field of view in dependence on the object detection.

12. A non-transitory computer readable medium comprising computer code which is adapted, when run on one or more processors, to perform the method of claim 8.

13. An object detection system for object detection within a field of view, comprising:
    a light source for providing detection illumination to the field of view;
    a sensor for sensing reflected light from the field of view; and
    a controller for processing the sensed reflected light to provide distance or presence information in relation the field of view,
    wherein the controller is adapted to control said light source to output light with a given intensity,
    wherein the given intensity of the light output by said light source is tailored to both a first extent of reflection, by a given object, of said light output by said light source and a second extent of reflection, by a background region adjacent to said given object, of said light output by said light source, wherein the first extent of reflection is different from the second extent of reflection.

* * * * *